United States Patent [19]

Koutz

[11] Patent Number: 4,576,783
[45] Date of Patent: Mar. 18, 1986

[54] HEAT PUMP AUGMENTATION OF NUCLEAR PROCESS HEAT

[75] Inventor: Stanley L. Koutz, San Diego, Calif.

[73] Assignee: GA Technologies Inc., San Diego, Calif.

[21] Appl. No.: 659,011

[22] Filed: Oct. 9, 1984

Related U.S. Application Data

[63] Continuation of Ser. No. 224,471, Jan. 12, 1981, abandoned.

[51] Int. Cl.⁴ .............................................. G21G 1/02
[52] U.S. Cl. .................................... 376/323; 376/325; 376/386; 376/391; 376/404; 62/238.6
[58] Field of Search ............... 376/317, 323, 324, 325, 376/383, 386, 391, 402, 404; 62/238.6; 60/655

[56] References Cited

U.S. PATENT DOCUMENTS

| | | |
|---|---|---|
| 2,970,434 | 2/1961 | Warren . |
| 3,210,943 | 9/1965 | Acklin . |
| 3,246,697 | 4/1966 | Natland . |
| 3,252,286 | 5/1966 | Whitelaw . |
| 3,258,909 | 7/1966 | Davis et al. . |
| 3,304,232 | 2/1967 | Schutt . |
| 3,329,575 | 7/1967 | Burbach ............................ 122/485 |
| 3,336,207 | 8/1967 | Peterson . |
| 4,093,868 | 6/1978 | Manning ............................ 62/238.6 |
| 4,293,384 | 10/1981 | Weber ................................. 376/391 |
| 4,302,292 | 11/1981 | Waclawiczek ..................... 376/325 |

*Primary Examiner*—Donald P. Walsh
*Attorney, Agent, or Firm*—Fitch, Even, Tabin & Flannery

[57] ABSTRACT

A system for increasing the temperature of a fluid heated by a high temperature gas cooled nuclear reactor to a sufficient temperature to supply the heat of reaction for a high temperature chemical process. The system includes a secondary loop having a working fluid heated to a first temperature by the nuclear reactor, and has a heat pump connected in the secondary loop and adapted to increase and thereby augment the temperature of the working fluid in the secondary loop sufficiently to supply the heat of reaction for a high temperature chemical process such as in a reformer. The system also provides low temperature heat in the form of steam which may be used in a turbine to provide power to the compressor of the heat pump and for auxilliary apparatus.

6 Claims, 1 Drawing Figure

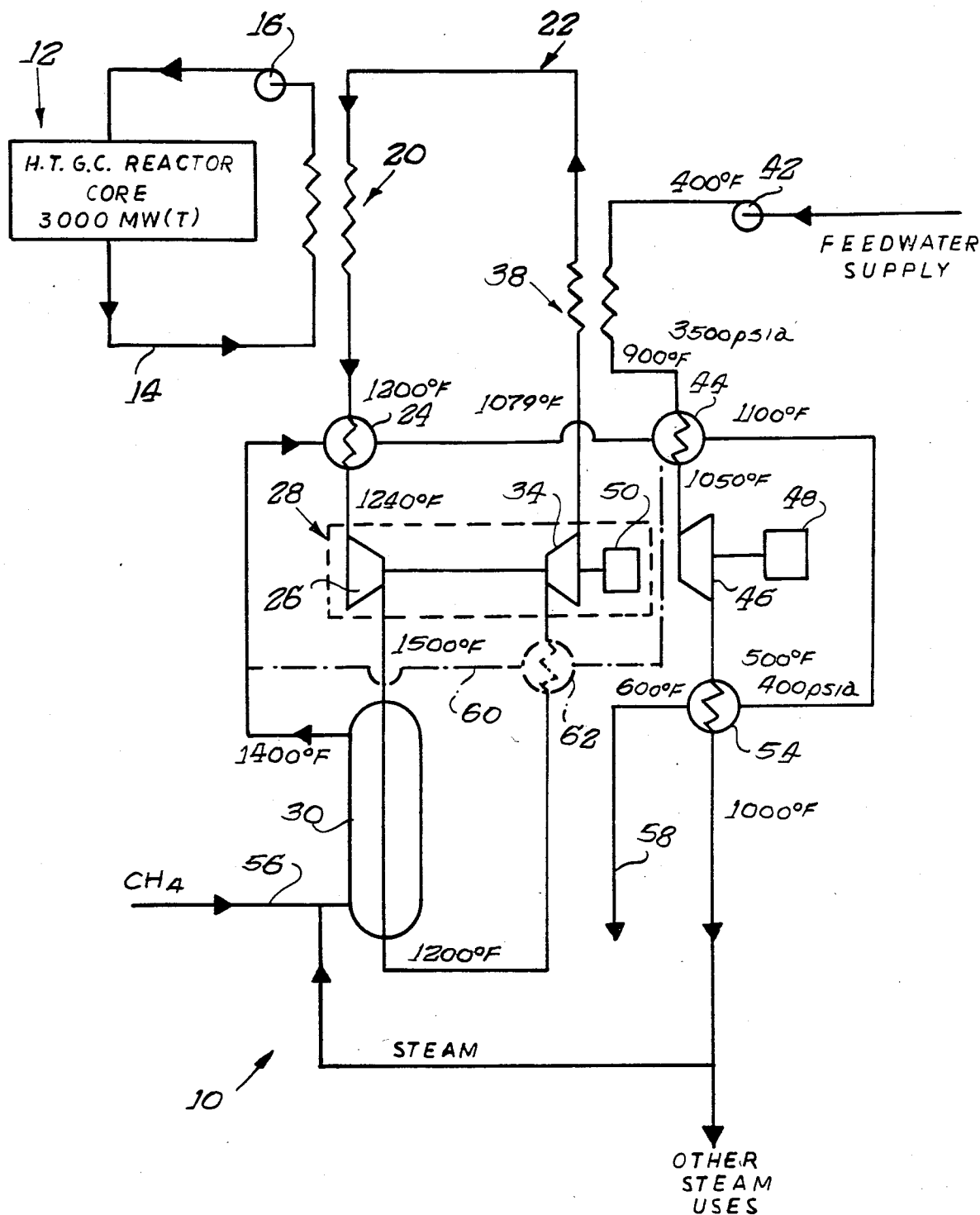

HEAT PUMP AUGMENTATION OF NUCLEAR PROCESS HEAT

This application is a continuation of application Ser. No. 224,471, filed Jan. 12, 1981, now abandoned.

The present invention relates generally to nuclear reactor systems, and more particularly to a novel system for augmenting the temperature of a working fluid heated by a nuclear reactor so as to provide the temperature necessary to carry out certain chemical processes.

Heat from a nuclear reactor can be employed to provide the energy necessary to carry out certain chemical reactions. However, in order for a nuclear reactor to be an economical source of heat for many chemical processes, the reactor must operate at temperatures higher than can be obtained with light water reactors or with gas cooled reactors based on present day technology. It is known to augment the temperature of a light water reactor in systems for converting heat to mechanical work in the form of electricity. See, for example, U.S. Pat. No. 3,329,575. However, the temperature of the working fluid, usually steam, obtained with a light water reactor is substantially lower, e.g., approximately 600° F., than is necessary to carry out many chemical processes requiring temperatures in the order of 1200°–1800° F.

It is believed that the use of nuclear energy in many processes, for example, the production of hydrogen by reforming a light hydrocarbon such as methane, or the production of hydrogen by thermal chemical water splitting, may result in the production of a more economical product or may have other advantages such as high product yield per unit of hydrocarbon feed or lower environmental consequences. While light water reactors cannot be operated at a temperature range enabling practical use as a source of heat for chemical processes requiring high temperatures, that is, temperatures in the range of about 1200°–1800° F., it is possible to obtain the required temperatures by utilizing a heat pump in combination with a high temperature gas cooled reactor constructed in accordance with present day technology.

One of the primary objects of the present invention is to provide a novel system for augmenting the temperature of a working fluid heated to a first temperature by a high temperature gas cooled reactor, the system employing a secondary loop containing the working fluid and having a heat pump operative to increase the temperature of the working fluid to a temperature sufficient to carry out high temperature chemical processes.

A feature of the present invention lies in the provision of a chemical process chamber, such as a reformer, in a process circuit or loop distinct from but cooperative with the secondary loop having the working fluid therein, the process chamber receiving a process fluid which is heated by the heat of the working fluid, and wherein the working fluid passes from the process chamber through a steam generator to provide low temperature heat in the form of steam to power a steam turbine for driving the compressor of the heat pump and auxiliaries. The steam, after partially expanding through the steam turbine, is fed to the process chamber for reaction with the process gas.

Still another feature of the present invention lies in the provision of a system for augmenting the temperature of a working fluid initially heated by a high temperature gas cooled nuclear reactor, which system employs a secondary loop having a heat pump operative to increase the temperature of the working fluid after initial heating by the reactor, and wherein the heat pump is located in a nonradioactive environment outside the reactor containment vessel so as to substantially reduce overall system costs.

Further, objects, advantages and features of the presnet invention, together with the organization and manner of operation, will become apparent from the following detailed description of the invention when taken in conjunction with the accompanying drawing which schematically illustrates the circuit of a system for augmenting the temperature of a working fluid heated by a high temperature gas cooled reactor in accordance with the present invention.

With reference to the drawing, a system in accordance with the present invention for increasing the temperature of a working fluid initially heated by a high temperature gas cooled nuclear reactor so as to increase the temperature of the working fluid sufficiently to supply the heat of reaction for a high temperature chemical process is indicated generally at 10. The system 10, which may alternatively be termed a system for augmenting nuclear process heat by heat pump means, is illustrated, by way of example, in a system in which hydrogen is produced in a chemical process by steam reforming methane. Such a chemical process requires high temperature heat to supply the heat of reaction and low temperature heat in the form of steam. As will become more apparent below, the principal underlying the system 10 may also be used to carry out other chemical reactions such as the production of hydrogen by thermal chemical water splitting.

The system 10 includes a high temperature gas cooled nuclear reactor, the core of which is indicated schematically at 12, having a cooling loop or circuit 14 through which a coolant such as helium is circulated by means of a primary circulator pump 16 of known design. In the illustrated embodiment, the helium coolant is heated to a temperature of approximately 1350° F. as it leaves the core 12 after which the heated coolant passes through an intermediate heat exchanger, indicated generally at 20, after which the coolant passes to the circulator 16 and back through the reactor core.

The system 10 includes a secondary loop or circuit, indicated generally at 22, which comprises a closed loop containing a working fluid such as nitrogen, helium, steam, carbon dioxide, or other suitable gas or mixture of gases. The working fluid in the secondary loop 22 flows through the intermediate heat exchanger 20 during which it is heated to approximately 1200° F. From the intermediate heat exchanger, the working fluid in the secondary loop 22 passes through a heat exchanger 24 during which the working fluid is heated to a temperature of approximately 1240° F. From the heat exchanger 24, working fluid passes through a compressor 26 which forms part of a heat pump the various components of which are schematically shown within a closed dash line 28. As will be described more fully hereinbelow, the heat exchanger 24 is heated by the products from a chemical process chamber 30 which, in the illustrated embodiment, comprises a reformer.

The compressor 26 is adapted to compress the working fluid in the secondary loop through a pressure ratio of approximately 1.6 to 1, thereby raising the temperature of the working fluid to approximately 1500° F. The working fluid is then passed through the reformer 30 during which the working fluid transfers heat to the reformer such that the working fluid is cooled to approximately 1200° F. as it exits the reformer. The 1200° F. working fluid is then expanded through a turbine 34 which forms a part of the heat pump 28 and supplies part of the energy required to drive the compressor 26. The working fluid is discharged from the turbine 34 at a temperature of approximately 1079° F. and passes through a steam generator, indicated generally at 38, of conventional design, after which the working fluid in the secondary loop again passes through the intermediate heat exchanger 20 to repeat the aforedescribed cycle within the secondary loop 22.

The steam generator 38 is connected in a steam loop or circuit adapted to receive feedwater from a suitable supply having preheat means (not shown) adapted to preheat the feedwater so that the feedwater exits from a circulator pump 42 at approximately 400° F. The preheated feedwater passes through the steam generator 38 which is adapted to produce steam at approximately 900° F. and 3500 psia. The steam from steam generator 38, passes through a heat exchanger 44 during which the steam is further heated to approximately 1050° F. after which the steam passes through a steam turbine 46 which is adapted to provide the shaft power necessary to drive the compressor 26, the reactor coolant circulator 16 and other auxilliaries (not shown) as may be desired. To this end, the steam turbine 46 drives a generator 48 having operative association with an electric motor 50 coupled to the shaft of turbine 34, so as to cooperate therewith in driving the compressor 26.

The steam, after partially expanding through the steam turbine 46, has a temperature of approximately 500° F. at 400 psia and passes through a heat exchanger 54 during which the steam is heated to approximately 1000° F. From the heat exchanger 54, the steam is fed to the process chamber 30 and may also be employed in other steam uses.

In accordance with an important feature of the present invention, the heat pump 28 increases or augments the temperature of the working fluid within the secondary loop 22 to provide the energy necessary to carry out certain chemical processes that require relatively high temperatures, for example, in the order of approximately 1200°–1800° F. In reforming a light hydrocarbon, a temperature of approximately 1200°–1500° F. is required, while in thermal chemical water splitting, temperatures in the order of approximately 1500°–1800° F. are required. In accordance with the present invention, the working fluid within the secondary loop is heated to approximately 1500° F. by the compressor 26, whereafter the heated working fluid is passed to and through the reformer 30 so as to provide a relatively high reaction temperature.

The process chamber or reformer 30 is connected in a process loop having an inlet line 56 connected to the reformer and, in the illustrated embodiment, to a suitable source of light hydrocarbon such as methane for the protection of hydrogen. The methane entering the line 56 is combined with steam from the steam turbine 46 and heat exchanger 54 after which the mixture passes to the reformer 30 and undergoes a chemical reaction resulting in the production of hydrogen. Alternatively, hydrogen may be produced by thermal chemical water splitting within the reformer 30.

In the case of producing hydrogen by reforming methane, the methane-steam mixture enters the reformer 30 and undergoes reformation after which the residual product fluids in the form of gases leaves the reformer at approximately 1400° F. and pass to the heat exchanger 24 to heat the working fluid passing to the compressor 26 from the intermediate heat exchanger 20. The product gases leaving the heat exchanger 24 are at a temperature of approximately 1240° F. and pass to the heat exchanger 44 to heat the steam passing to the steam turbine 46 from the steam generator 38. In passage through the heat exchanger 44, the residual process fluid temperature drops to 1100° F. after which the process fluid passes through the heat exchanger 54 where it undergoes a further temperature drop to approximately 600° F. after which the process fluid may be passed to downstream process steps through a flow line 58.

The aforedescribed system 10 may undergo a number of variations. For example, discharge temperatures from the compressor 26 higher than 1500° F. are possible if the intermediate heat exchanger 20 discharge temperature is increased, or if more power is produced in the steam turbine 46 by expansion of the steam to a lower pressure. The products from the reformer 30 in the process loop may, as an alternative to the system illustrated schematically in solid lines in FIG. 1, be passed directly to the heat exchanger 44 through a flow circuit as shown in phantom at 60. In this alternative circuit, the reformer products pass through a heat exchanger 62 connected in heat exchange relation with the input to the turbine 34. In this manner, heat from the products of the reformer 30 is transferred to the working fluid in the secondary loop as it enters turbine 34 rather than being transferred to the working fluid as it enters the compressor 26.

Use of a heat pump in conjunction with a high temperature gas cooled reactor as aforedescribed enables obtaining a working fluid several hundred degrees hotter than can be obtained with a steam cycle high temperature gas cooled reactor. It also reduces the requirements on the intermediate heat exchanger, such as 20, to a point where present day materials can be utilized in its construction. A feature of the described system 10 is that the heat pump 28 may be operated at modest temperatures, by turbomachinery standards, and may be located in a nonradioactive environment outside the reactor containment vessel, thereby leading to substantial reduction in development costs and time.

While a preferred embodiment of the present invention has been illustrated and described, it will be understood that changes and modifications may be used therein without departing from the invention in its broader aspects. Various features of the invention are defined in the following claims.

I claim:

1. A system for increasing the temperature of a working fluid heated by a nuclear reactor, said system comprising, in combination, a high temperature gas cooled nuclear reactor having a core and a primary cooling loop through which a coolant is circulated so as to undergo an increase in temperature, a closed secondary loop having a working fluid therein, said cooling and secondary loops having cooperative association with an intermediate heat exchanger adapted to effect transfer of heat from said coolant to said working fluid as said working fluid passes through said intermediate heat exchanger, a heat pump connected in said secondary loop and including a turbine and a compressor through which said working fluid passes so that said working fluid undergoes an increase in temperature as it passes through said compressor, a process loop including a process chamber adapted to receive a process fluid therein, said process chamber being connected in circuit with said secondary loop so as to receive said working fluid from said compressor and transfer heat from said working fluid to said process fluid, a heat exchanger for heating the working fluid connected to the process loop for receiving heat therefrom and for transferring heat to the secondary loop prior to said working fluid passing through said compressor, said secondary loop being operative to pass said working fluid from said process chamber to said turbine so as to effect driving relation thereof, a steam generator operatively associated with said secondary loop so as to receive said working fluid from said turbine, and a steam loop having a feed water supply and connected in circuit with said steam generator so that feed-water passing through said steam loop is heated by said steam generator, said steam loop being connected in circuit with said process chamber and adapted to pass steam to said process chamber with said process fluid.

2. The system as defined in claim 1 wherein said turbine of said heat pump comprises a first turbine, said steam loop including a second turbine connected to receive heated feedwater from said steam generator so as to drive said second turbine, said second turbine having operative association with said compressor so as to augment the driving energy applied thereto.

3. The system as defined in claim 2 including an additional heat exchanger operatively associated with said process loop and said steam loop and operative to increase the temperature of steam as it passes from said steam generator to said second turbine.

4. The system as defined in claim 3 including an additional heat exchanger connected in circuit with said process and steam loops and adapted to increase the temperature of steam discharged from said second turbine.

5. The system as defined in claim 2 including a heat exchanger connected in circuit with said process and secondary loops and adapted to receive heat products from said process chamber and increase the temperature of said working fluid as it passes from said compressor to said turbine.

6. The system as defined in claim 2 including an electric generator connected to said second turbine so as to be driven thereby, said electric generator having operative association with said first turbine so as to provide supplemental driving energy for said compressor.

* * * * *